(12) United States Patent
Dean et al.

(10) Patent No.: US 6,375,207 B1
(45) Date of Patent: Apr. 23, 2002

(54) RETRACTABLE RUNNING BOARD

(75) Inventors: Thomas Dean, Newmarket; Robert R. MCaughey, Richmond Hill; Brad Armstrong, Barrie; Lassi M. Ojanen, Richmond Hill, all of (CA); Robert D. Worley, Fenton, MI (US); John Kleino, Rochester Hills, MI (US); Paul Pirone, Clarkston, MI (US)

(73) Assignee: Decoma Exterior Trim, Concord (CA)

( * ) Notice: Subject to any disclaimer, the term of this patent is extended or adjusted under 35 U.S.C. 154(b) by 0 days.

(21) Appl. No.: 09/510,544

(22) Filed: Feb. 22, 2000

Related U.S. Application Data

(60) Provisional application No. 60/121,063, filed on Feb. 22, 1999.

(51) Int. Cl.[7] ................................................. B62D 25/22
(52) U.S. Cl. ...................... 280/166; 280/163; 280/169; 182/88
(58) Field of Search ................................ 280/166, 163, 280/169, 727, 153 R; 414/392; 182/90, 94, 77, 88, 91

(56) References Cited

U.S. PATENT DOCUMENTS

| | | | | |
|---|---|---|---|---|
| 2,764,422 A | * | 9/1956 | McDonald ................... | 280/166 |
| 3,608,957 A | | 9/1971 | Maneck | |
| 3,799,288 A | * | 3/1974 | Manuel ........................ | 182/91 |
| 3,833,240 A | * | 9/1974 | Weiler ........................ | 280/166 |
| 3,887,217 A | | 6/1975 | Thomas | |
| 4,058,228 A | * | 11/1977 | Hall ........................... | 214/77 R |
| 4,180,143 A | * | 12/1979 | Clugston ..................... | 182/91 |
| 4,536,004 A | * | 8/1985 | Brynielsson et al. ........ | 280/166 |
| 5,137,294 A | | 8/1992 | Martin | |
| 5,498,012 A | * | 3/1996 | McDaniel et al. .......... | 280/166 |
| 5,697,626 A | | 12/1997 | McDaniel et al. | |
| 5,842,709 A | * | 12/1998 | Maccabee ................... | 280/166 |
| 5,957,237 A | * | 9/1999 | Tigner ........................ | 182/127 |
| 6,082,751 A | * | 7/2000 | Hanes et al. ................ | 280/163 |
| 6,149,172 A | * | 11/2000 | Pascor et al. ............... | 280/166 |
| 6,158,756 A | * | 12/2000 | Hansen ....................... | 280/166 |

FOREIGN PATENT DOCUMENTS

| | | | | |
|---|---|---|---|---|
| CA | 2299065 A1 | * | 8/2000 | ......... B62D/25/22 |
| CA | 2300641 | * | 9/2000 | ......... B62D/25/22 |
| IT | 000447372 A1 | * | 9/1991 | ............ B60R/3/02 |
| JP | 405310081 A | * | 11/1993 | ............ B60R/3/02 |
| WO | WO 00/50262 | * | 8/2000 | ............ B60R/3/02 |

* cited by examiner

*Primary Examiner*—Lanna Mai
*Assistant Examiner*—Paul Royal, Jr.
(74) *Attorney, Agent, or Firm*—Clark Hill PLC

(57) ABSTRACT

A retractable running board assembly has a step, at least two support arms, at least two mounting brackets, at least two pairs of parallel links and a drive. The step has an elongated stepping surface extending generally parallel to a longitudinal axis of a vehicle on which the running board assembly is mounted. The support arms are mounted to the step. The mounting brackets are connected to an underside of the vehicle. The parallel links are pivotally connected between each of the support arms and the mounting brackets. The drive effects movement of the step between an extended outboard position and a retracted inboard position.

9 Claims, 6 Drawing Sheets

RETRACTABLE RUNNING BOARD

"This application claims the benefit under 35 USC section 119(e) of U.S. Provisional Application No. 60/121,063, filed Feb. 22 1999."

BACKGROUND OF THE INVENTION

1. Field of the Invention

The present invention generally relates to a retractable running board for a vehicle such as a pick up truck or a van.

2. Description of the Related Art

Running boards are commonly found on pick up trucks, vans, sport utility vehicles and other types of automobiles. Running boards serve as a step, particularly on vehicles where the vehicle has a high clearance, providing easier access to the vehicle.

It has been found that it can be advantageous to have a running board which retracts when not in use. For example, a fixed running board's lateral extension can create a risk of damage to the running board and the vehicle during travel through a narrow passage. Retracting the running board reduces this risk. A retracted running board can also improve the aerodynamics of a vehicle, and thus the fuel efficiency of the vehicle.

Several different types of retractable running boards are known in the art. U.S. Pat. No. 3,887,217 to Thomas discloses a retractable step which is powered by a reversible motor and is clamped to the frame of the vehicle via a vertical base. Two inwardly-angled outer frame members depend respectively from the opposite ends of the step and converge at the vertical base, while a third frame member depends from the center of the step and joins the convergence of the outer frame members at the vertical frame. The third frame member is engaged by the motor, also mounted to the vertical base. While providing a retractable step, Thomas suffers from decreased fore and aft stability as the depth of the step is increased, due to the single linkage of the frame members to the inner edge of the step. Further, the Thomas mechanism must be clamped to the vehicle, which can create difficulties during installation, and risks the possibility of improper installation. Thomas also requires clamping to a vehicle frame, which is not always possible on modem uni-body frame less vehicles. Finally, as shown in FIG. 1 of Thomas, the retractable running board in Thomas can actually decrease the vehicle ground clearance, as a portion of the outer frame members swing underneath the frame in the retracted position.

U.S. Pat. No. 5,137,294 to Martin discloses a step assembly for vehicles which simply raises and lowers the step by pivoting the step about an axis perpendicular to the longitudinal horizontal axis of the vehicle. A spring mechanically biases the step into a raised position, while a cable mechanically links the door to the step, such that opening the door lowers the step, while closing the door raises the step. This arrangement is disadvantageous because an interference between the step and the ground can prevent the door from being opened, thus creating a safety hazard. Further, the spring in Martin increases the effort required to open the door, as the spring biases the step into a closed position, it also biases the door towards a closed position. Also, the step in Martin lacks fore and aft support, thus decreasing the stability of the step as the step depth is increased. Finally, the step in Martin does not laterally retract towards the body of the vehicle, thus exposing the step to damage during driving through certain narrow passageways.

U.S. Pat. No. 5,697,626 to McDaniel et al. discloses a vehicle running board which raises when the vehicle door is closed, and lowers when the vehicle door is opened. The running board in McDaniel comprises first and second outer telescoping members. Each member is mounted by its distal end to the vehicle, while a spring urges the telescoping portion of each member into a retracted position. A central longitudinal running board member is pivotally mounted between the outer members. A linkage can be actuated to swing the outer members downwards and telescope outwards, thereby lowering the running board. McDaniel does not retract the step, but only raises it, thus exposing the running board to damage during vehicle operation through narrow passages. Further, the lack of central support in the running board can result in deflection of the board when subjected to heavier weights.

It will thus be apparent that improvements to the art of retractable running boards is desirable.

SUMMARY OF THE INVENTION

Accordingly, it is an object of the present invention to provide a novel retractable running board which obviates or mitigates at least one of the disadvantages of the prior art.

In a first broad aspect of the present invention, there is provided a retractable running board for a vehicle, wherein the running board comprises a bracket for attachment to the vehicle, a step for assisting entrance to and exit from the vehicle and a parallelogram linkage connecting the step to the bracket. The step is moveable between a retracted position under the vehicle and an extended position extending from the vehicle. In order to move the step, a motor is provided.

According to another aspect of the invention, there is provided a retractable running board assembly which has a step, at least two support arms, at least two mounting brackets, at least two pairs of parallel links and a drive. The step has an elongate stepping surface extending generally parallel to a longitudinal axis of a vehicle on which the running board assembly is mounted. The support arms are mounted to the step. The mounting brackets are connected to an underside of the vehicle. The parallel links are pivotally connected between each of the support arms and the mounting brackets. The drive effects movement of the step between an extended outboard position and a retracted inboard position.

BRIEF DESCRIPTION OF THE DRAWINGS

Preferred embodiments of the present invention will now be described, by way of example only, with reference to the attached Figures, wherein.

DETAILED DESCRIPTION OF THE PREFERRED EMBODIMENT

Figure 1:
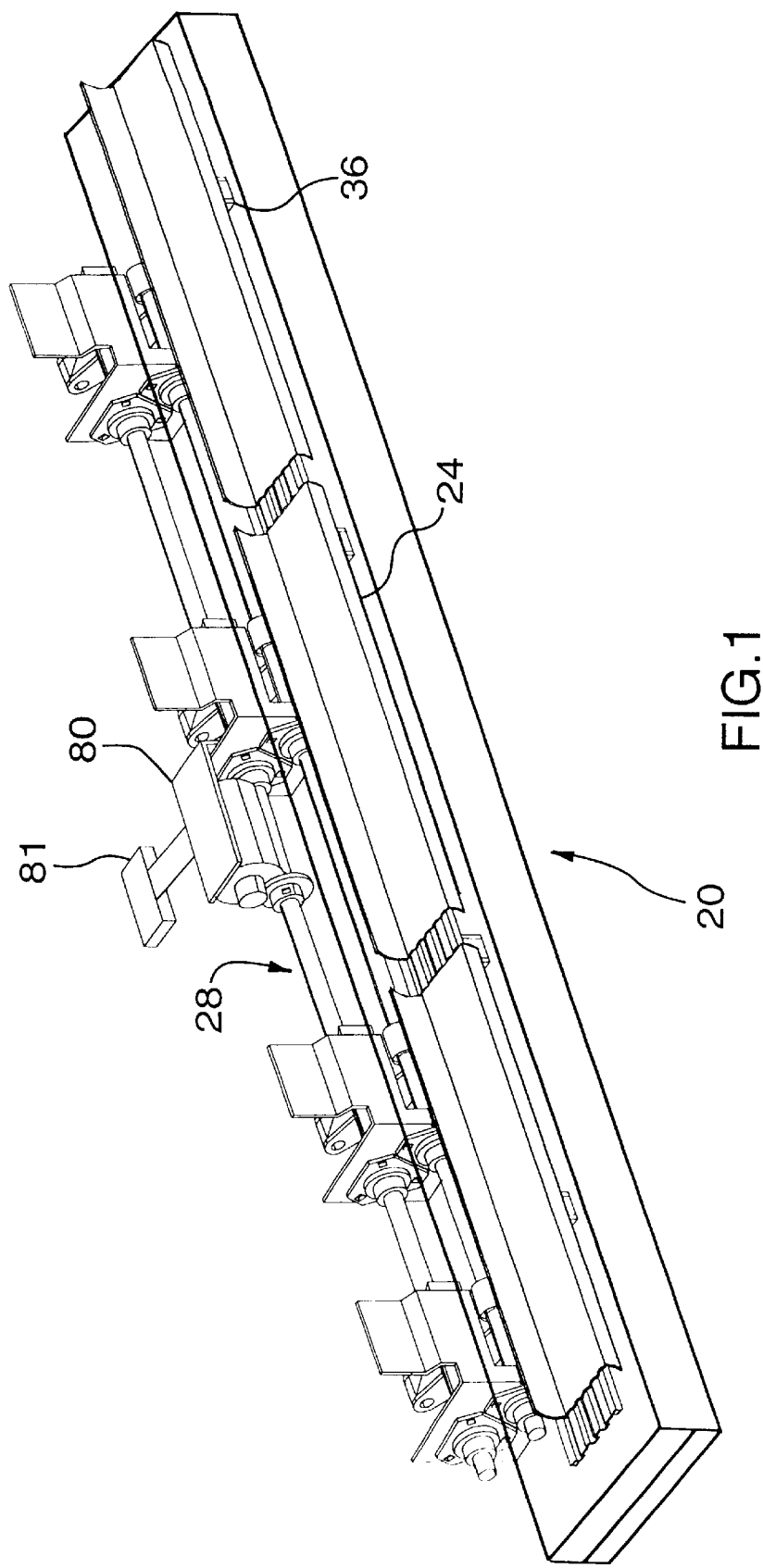
FIG. 1 is a perspective view of a retractable running board in accordance with the present invention is shown in the retracted position.

Referring to FIG. 1, a retractable running board in accordance with an embodiment of the present invention is indicated generally at 20, and mounts to a pick up truck, car, van or any other suitable vehicle. Board 20 is mounted to the underbody of the vehicle proximate a door frame. Board 20 generally comprises a step or deck 24 and a retracting mechanism 28. For purposes of describing the present invention, a vehicle underbody can refer to either the underside of a vehicle with a frame, or the underside of a unibody vehicle having no frame.

Step 24 is characterized by an elongated stepping surface 36 extending generally longitudinally of the vehicle. Step 24 assists entrance to and egress from the vehicle. Step 24 can be shaped in any number of ways to coordinate with the shape and color of the vehicle, and it will be appreciated that such variations are within the scope of the present invention.

Figure 2:
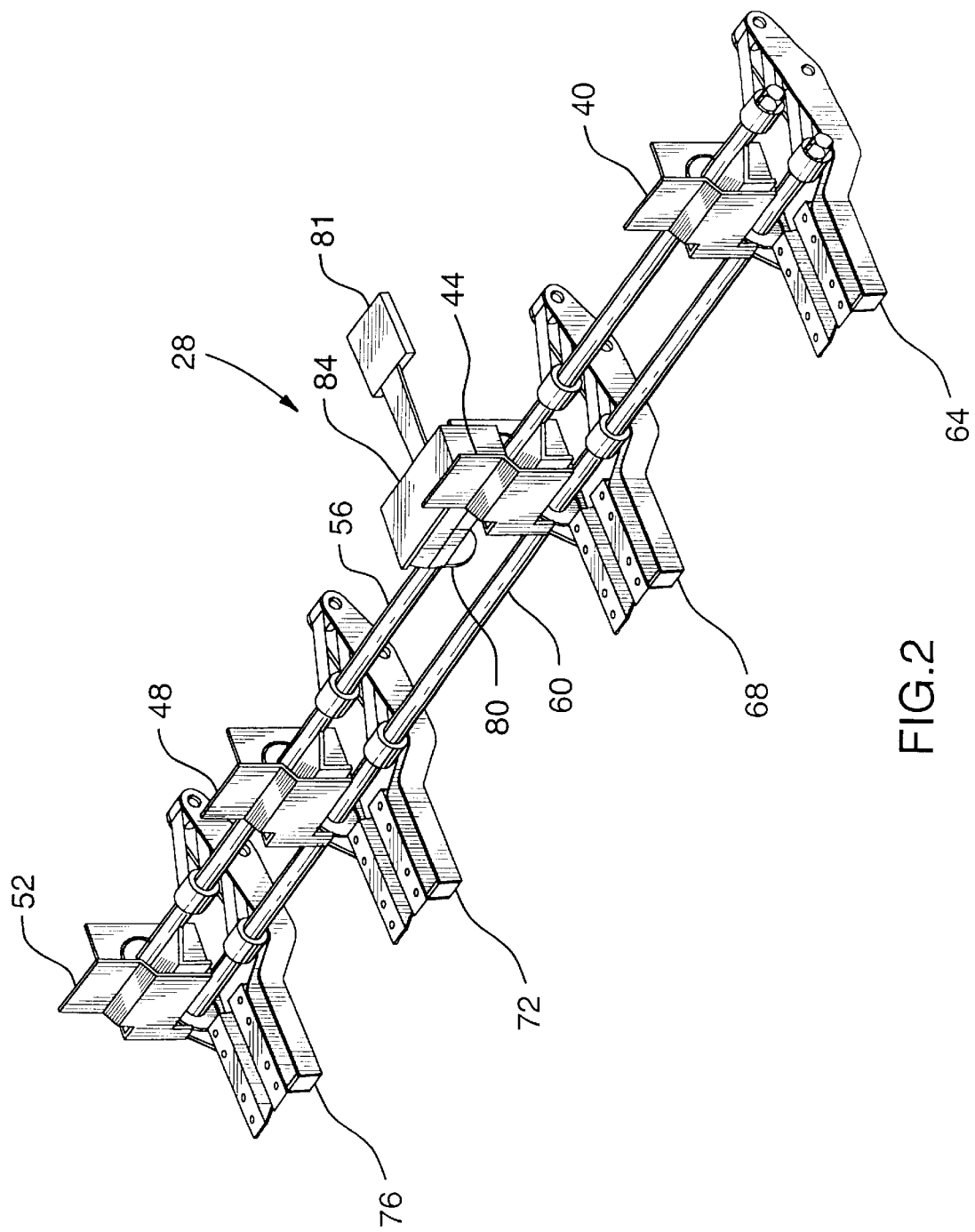
FIG. 2 is a perspective view of a retractable running board mechanism of the running board as shown in FIG. 1.
Figure 3:
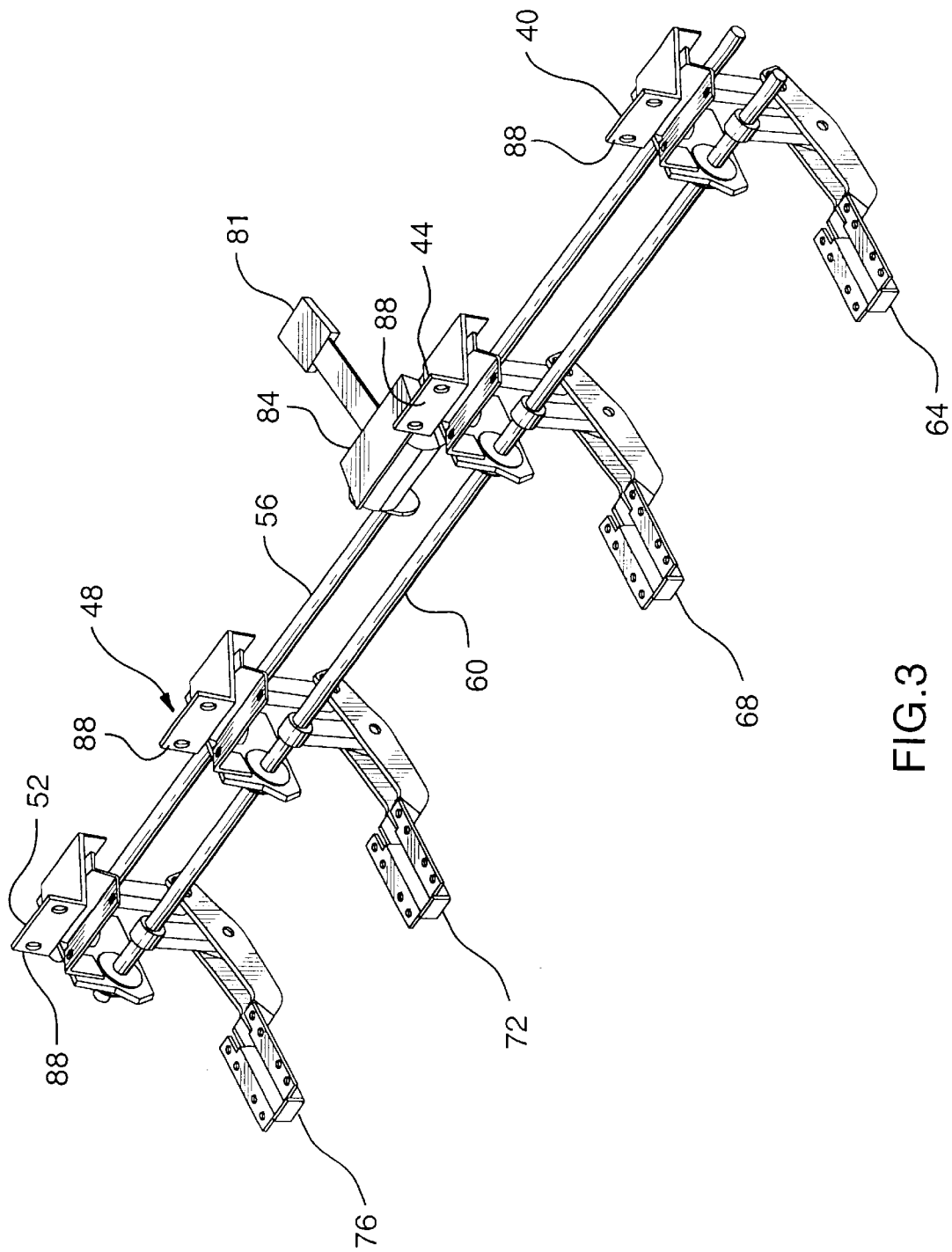
FIG. 3 is a perspective view of the retractable running board mechanism in FIG. 2 shown in the extended position.

Referring to FIGS. 2 and 3, retracting mechanism 28 comprises four mounting brackets 40, 44, 48, 52, a first shaft 56, a second shaft 60 and pivot arm assemblies 64, 68, 72, 76. Together, first shaft 56, second shaft 60, and pivot arm assemblies 64, 68, 72, 76 form a parallel linkage which connects brackets 40, 44, 48, 52 to step 24. Preferably, shaft 60 is positioned relatively outboard and lower than shaft 56.

Additionally, retracting mechanism 28 includes a reversible motor 80 connected to a source of electricity from the vehicle.

Mounting brackets 40, 44, 48, 52 are spaced along rods or shafts 56, 60, so as to distribute forces on running board 20 along the underbody of the vehicle. The number and locations of the mounting brackets depends on the available mounting points on the vehicle and will thus depend upon the particular vehicle design. Similarly, pivot arm assemblies 64, 68, 72, 76 are spaced along shafts 56, 60. Preferably, pivot arm assemblies 64, 68, 72, 76 are placed proximate mounting brackets 40, 44, 48, 52 respectively, to transfer weight from step 24 to the vehicle underbody or frame. However, it will be understood that pivot arm assemblies 64, 68, 72, 76 can be located at various positions along shafts 56, 60.

Motor 80 is mounted via motor bracket 84 to bracket 44 and drivingly engages shaft 56, as will be explained in greater detail below. Motor 80 is electrically connected to a controller 81, which selectively actuates motor 80 in accordance with various inputs. FIG. 2 shows mechanism 28 in the retracted position, while FIG. 3 shows mechanism 28 in the extended position.

Figure 4:
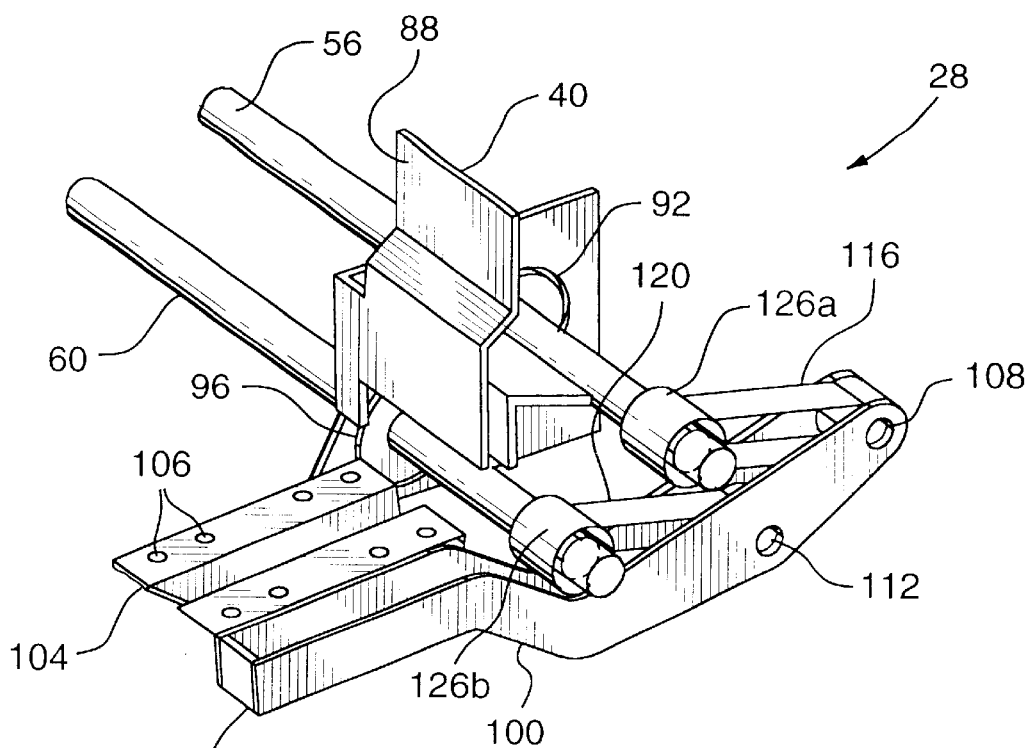
FIG. 4 is a perspective view of a motor and a central pivot arm assembly of the retractable running board shown in FIGS. 1–3.
Figure 5:
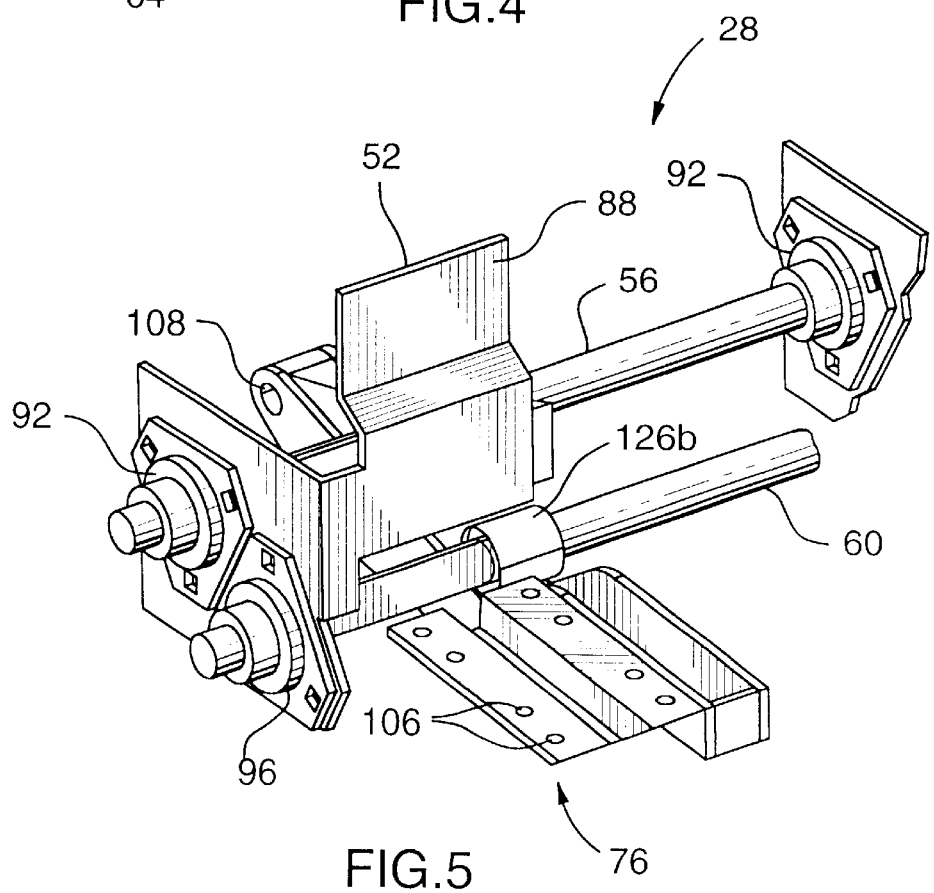
FIG. 5 is a perspective view of a pivot arm assembly.
Figure 6:
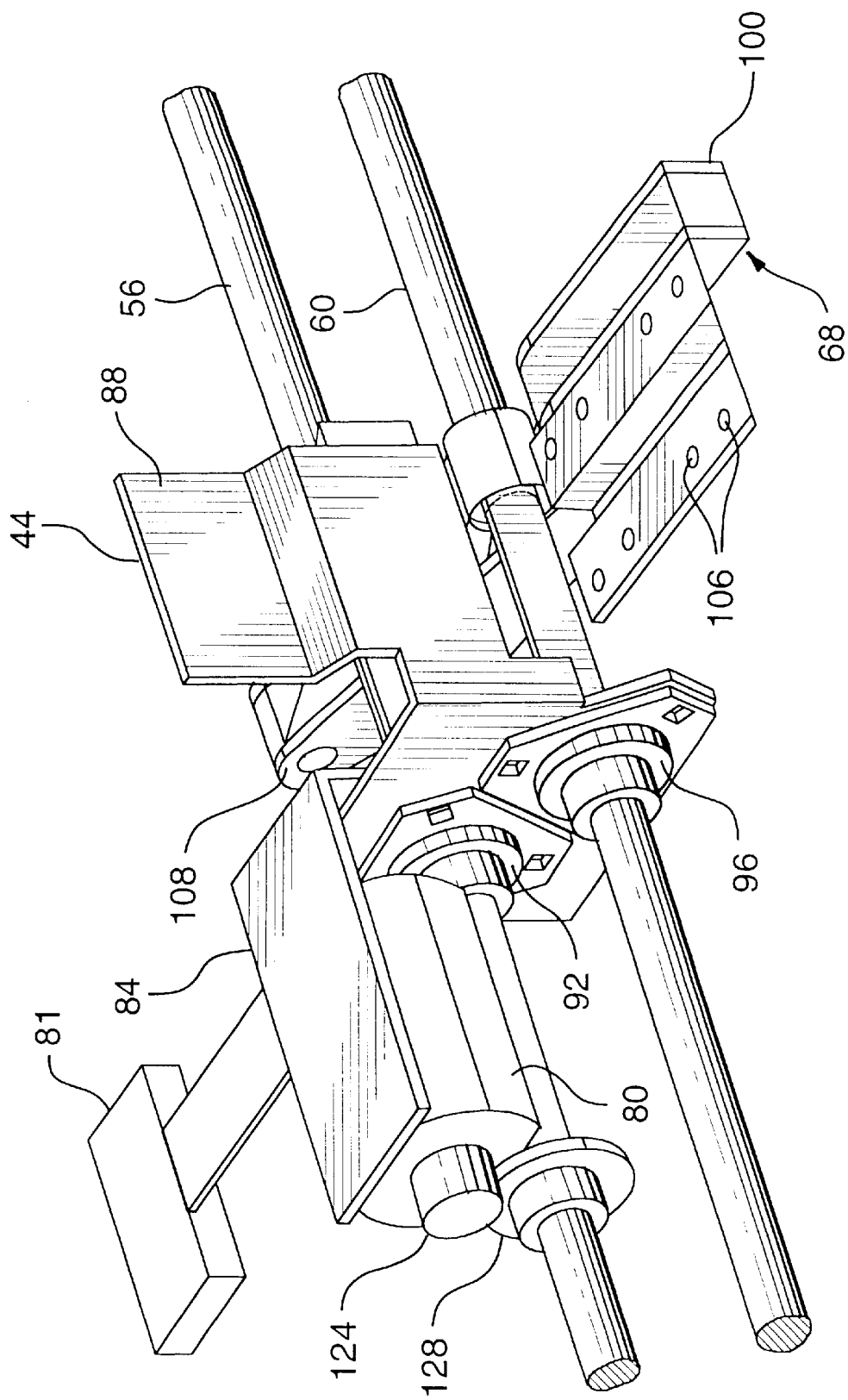
FIG. 6 is a perspective view of a second pivot arm assembly.
Figure 7:
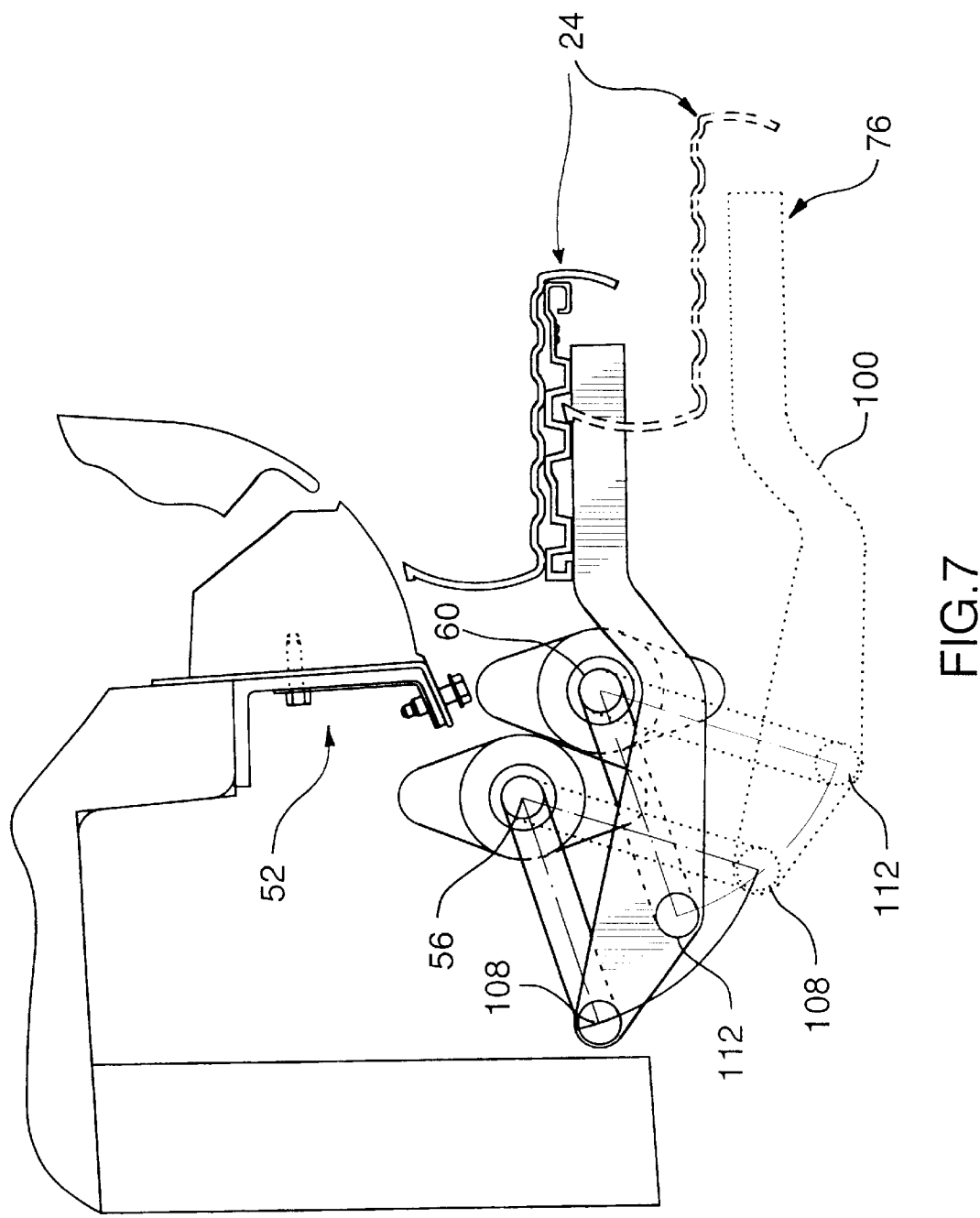
FIG. 7 is a sectional view along the axis of the shafts of the retractable running board, showing the extended and retracted positions.

The interconnection of the components of mechanism 28 is shown in greater detail with reference to FIGS. 4–6. FIG. 4 is a partial view of one end of mechanism 28. Bracket 40 comprises plate 88 for fastening bracket 40 to the vehicle underbody or frame. Any fastening method known in the art can be used, such as spot welding, arc welding or bolting. Bracket 40 further comprises sleeves 92, 96 which journal mounts shafts 56, 60 respectively, and allow free rotation of these shafts. In the present embodiment, sleeves 92, 96 are sleeve bearings but it will be appreciated that the bearing function of sleeves 92, 96 can be provided in other ways, such as a combination of spacers and bearings, as will occur to those skilled in the art.

Pivot arm assembly 64 comprises an arm 100 having a step mount 104 at one end and elbows 108, 112 at the opposite end. Step mount 104 is provided with flanges having apertures 106 for receiving fasteners to affix step 24 to step mount 104. Arm 100 extends arcuately from the step mount 104 to the elbows 108, 112. It is readily understood that step mount 104 can have any configuration to complement the underside of step 24.

Pivot link 116 is pivotally mounted to a pin housed within elbow 108 at one end, and is affixed to shaft 56 at its opposite end. Similarly, pivot link 120 is pivotally mounted to a pin housed within elbow 112 at one end, and is affixed to shaft 60 at its opposite end.

It will now be apparent that mounting brackets 44, 48 and 52 are identical to mounting bracket 40, and that pivot arm assemblies 68, 72 and 76 are identical to pivot arm assembly 64. It will be also apparent that, while the present embodiment illustrates the use of four mounting brackets and four pivot arm links, the use of at least two brackets in combination with two or more links is within the scope of the present invention. It will also be understood that plates 88 of mounting brackets 40, 44, 48 and 57 can be integral to form a single mounting bracket traversing the length of mechanism 128.

Referring to FIG. 6, a partial view of the central portion of assembly 28 is shown. As previously mentioned, bracket 44 is identical bracket 40, and pivot arm assembly 68 is identical to assembly 64. Motor bracket 84 is affixed to bracket 44 at a point adjacent sleeve 92 of bracket 44. Motor 80 is enclosed by and affixed within bracket 84, and further comprises drive gear 124. Gear 124 engages spur gear 128, which is affixed to the outer diameter of shaft 56.

The operation of the present embodiment of the present invention will now be explained with reference to FIGS. 1–7 and the above description. Motor 80 is in an "off" or "neutral" condition, and running board 20 is in the retracted position, as illustrated in FIG. 2. An input is provided to controller 81 by any suitable means, such as the activation of a switch by a vehicle operator or the opening of the door of the vehicle. Controller 81 then sends a signal to motor 80, causing motor 80 to rotate in an extending sense. Drive gear 124 engages spur gear 128, causing shaft 56 to rotate within the sleeve 92 of each mounting bracket 40, 44, 48, 52. The rotation of shaft 56 causes the collar 126a to rotate the pivot link 116 on each of pivot arm assemblies 64, 68, 72, 76. Shaft 60 follows the rotation of shaft 56 via pivot link 120 and collar 126b. In turn, arms 100 are extended laterally away from the frame of the vehicle, so as to place step 24 in the extended position. Motor 80 is then deactivated by any suitable means, such as a device within controller 81 for detecting the exact number of turns of motor 80 necessary to extend step 24. Once in the extended outboard position, the vehicle occupant can climb into or out of the vehicle, using step 24 to facilitate the climb.

To retract, an input is provided to controller 81 by any suitable means, such as the activation of a switch by a vehicle operator or the closing of the door of the vehicle. Controller 81 then sends a signal to motor 80, causing motor 80 to rotate in a sense opposite to the extended sense. Drive gear 124 engages spur gear 128, causing shaft 56 to rotate in a reverse direction within the sleeve 92 of each mounting bracket 40, 44, 48, 52. The rotation of shaft 56 causes the collar 126a to engage pivot link 116 on each of pivot arm assemblies 64, 68, 72, 76. Shaft 60 follows the rotation of shaft 56 via pivot link 120 and collar 126b. In turn, arms 100 are retracted inboard towards the frame of the vehicle, so as to place step 24 in the retracted inboard position. Motor 80 is then deactivated by any suitable means, such as a device within controller 81 for detecting the exact number of turns of motor 80 necessary to retract step 24.

The positioning of the axis of rotation of the shafts 56, 60 allows the pivot links 116, 120 to rotate inboard and upwardly, thereby moving the step 24 upwardly and inboard. This arrangement has the advantage that the stored position of the step 24 is relatively up and thus does decrease the ground clearance of the vehicle.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A retractable running board assembly comprising:
    a step having an elongated stepping surface extending generally parallel to a longitudinal axis of a vehicle;
    at least two spaced apart mounting brackets configured for connection to an underside of the vehicle and generally parallel to the longitudinal axis thereof;
    a first elongated shaft rotatably mounted to each of the mounting brackets and extending longitudinally parallel to said step;
    a second elongated shaft rotatably mounted to each of said mounting brackets and spaced from and generally parallel to said first shaft;
    a step pivot arm assembly extending between opposing first and second ends extending transverse to said longitudinal axis with said first end fixedly mounted to said step;
    a first pivot link having a first end fixedly secured to said first shaft and an opposing second end rotatably journaled to said second end of said step pivot arm assembly:
    a second pivot link having a first end fixedly secured to said second shaft and an opposing second end rotatably journaled to said pivot arm assembly between said first and second ends thereof wherein rotation of one of said shafts effects lateral movement of said step transverse to said longitudinal axis between an extended outboard position and a retracted inboard position;
    a motor, mounted for support on one of said mounting brackets, said motor operatively coupled to one of said shafts whereby energizing said motor selectively effects said movement of said step between said extended outboard position and said retracted inboard position; and
    at least two spaced apart and generally parallel pivot arm assemblies operatively coupled to said first and second shafts and fixedly mounted to said step.

2. A retractable running board assembly as set forth in claim 1 further including first and second pivot links coupled between each of said first and second shafts respectively and said step.

3. A retractable running board assembly as set forth in claim 2 wherein each of said first steps pivot links includes a first end fixedly secured to said first shaft and an opposing second end rotatable journaled to said second end of said respective step pivot arm assembly.

4. A retractable running board assembly as set forth in claim 3 wherein each of said second step pivot links includes a first end fixedly secured to said second shaft and an opposing second end rotatably journaled to said respective step pivot arm assembly between said first and second ends thereof.

5. A retractable running board assembly as set forth in claim 4 further including a controller operatively coupled to said motor for selectively actuating said motor and effecting said movement of said step between said extended outboard position and said retracted inboard position.

6. A retractable running board assembly as set forth in claim 5 wherein each of said step pivot arm assemblies includes a arcuate arm having a step mount defining said first end for supporting said step thereon, a first elbow for pivotally coupling said first step pivot link and a second elbow spaced between said step mount and said first elbow for pivotally coupling said second step pivot link.

7. A retractable running board assembly as set forth in claim 6 wherein said second shaft is mounted relatively outboard and lower than said first shaft.

8. A retractable running board assembly as set forth in claim 7 wherein said retracted inboard position of said step is relatively higher than said extended outboard position of said step.

9. A retractable running board assembly as set forth in claim 8 wherein each of said mounting brackets includes first and second sleeves secured thereto to rotatably coupled said first and second shafts respectively to said mounting bracket and provide free rotation thereof.

* * * * *